United States Patent
Matsuda et al.

(10) Patent No.: US 10,160,863 B2
(45) Date of Patent: Dec. 25, 2018

(54) PRIMER COATING COMPOSITION FOR ALUMINUM WHEELS

(71) Applicant: KANSAI PAINT CO., LTD., Hyogo (JP)

(72) Inventors: Hideki Matsuda, Kanagawa (JP); Hiroe Homma, Kanagawa (JP)

(73) Assignee: KANSAI PAINT CO., LTD., Hyogo (JP)

(*) Notice: Subject to any disclaimer, the term of this patent is extended or adjusted under 35 U.S.C. 154(b) by 0 days.

(21) Appl. No.: 14/391,059

(22) PCT Filed: Mar. 24, 2014

(86) PCT No.: PCT/JP2014/058126
§ 371 (c)(1),
(2) Date: Oct. 7, 2014

(87) PCT Pub. No.: WO2014/181593
PCT Pub. Date: Nov. 13, 2014

(65) Prior Publication Data
US 2015/0210862 A1   Jul. 30, 2015

(30) Foreign Application Priority Data
May 8, 2013   (JP) ................................ 2013-098611

(51) Int. Cl.
| | | |
|---|---|---|
| *C09D 133/24* | (2006.01) | |
| *C09D 125/14* | (2006.01) | |
| *C09D 133/08* | (2006.01) | |
| *C09D 5/00* | (2006.01) | |
| *B60B 3/00* | (2006.01) | |
| *C09D 163/00* | (2006.01) | |
| *C08F 212/08* | (2006.01) | |
| *C09D 5/08* | (2006.01) | |
| *C09D 7/61* | (2018.01) | |
| *C09D 7/62* | (2018.01) | |
| *C08K 3/36* | (2006.01) | |
| *C08K 3/32* | (2006.01) | |

(52) U.S. Cl.
CPC .............. *C09D 5/002* (2013.01); *B60B 3/00* (2013.01); *C08F 212/08* (2013.01); *C09D 5/084* (2013.01); *C09D 7/61* (2018.01); *C09D 7/62* (2018.01); *C09D 125/14* (2013.01); *C09D 133/08* (2013.01); *C09D 133/24* (2013.01); *C09D 163/00* (2013.01); *B60B 2360/104* (2013.01); *B60B 2900/141* (2013.01); *B60B 2900/321* (2013.01); *C08K 3/36* (2013.01); *C08K 2003/326* (2013.01)

(58) Field of Classification Search
CPC ........ C09D 5/002; C09D 7/12; C09D 133/24; C09D 125/14; C09D 133/08

USPC ............ 427/385.5, 401.1; 523/451; 524/417, 524/493
See application file for complete search history.

(56) References Cited

U.S. PATENT DOCUMENTS

| | | | | |
|---|---|---|---|---|
| 3,932,342 | A | * | 1/1976 | Nagata ............... C08G 18/6225 524/441 |
| 4,730,020 | A | | 3/1988 | Wilfinger et al. |
| 2005/0147832 | A1 | * | 7/2005 | Okai .................. C08G 59/4035 428/447 |
| 2006/0276589 | A1 | | 12/2006 | Kato et al. |
| 2007/0166466 | A1 | * | 7/2007 | Kashiwada ............ C09D 5/028 427/372.2 |
| 2009/0192247 | A1 | | 7/2009 | Daly et al. |
| 2013/0313888 | A1 | | 11/2013 | Uemura et al. |

FOREIGN PATENT DOCUMENTS

| | | |
|---|---|---|
| CN | 1572804 | 2/2005 |
| CN | 101497754 | 8/2009 |
| JP | 61-203179 | 9/1986 |
| JP | 5-51553 | 3/1993 |
| JP | 2000-136323 | 5/2000 |
| JP | 2002-241674 | 8/2002 |
| WO | 2004/094545 | 11/2004 |
| WO | WO2011/131721 | * 10/2011 |
| WO | 2012/096331 | 7/2012 |

OTHER PUBLICATIONS

Yiliang Zhu et al., Pigment Technology, Chemical Industry Press, 2nd edition, Jan. 31, 2002, p. 339 (cited in CB and concise explanation provided in CB).
Office Action dated Jul. 15, 2016 in corresponding Chinese Patent Application No. 201480001568.3 (English translation).

* cited by examiner

*Primary Examiner* — Deve E Valdez
(74) *Attorney, Agent, or Firm* — Wenderoth, Lind & Ponack, L.L.P.

(57) ABSTRACT

An object of the present invention is to find a primer coating composition for aluminum wheels, the composition having excellent stability and being capable of forming a coating film having excellent corrosion resistance, edge corrosion resistance, and filiform corrosion resistance. The invention provides (1) a primer coating composition for aluminum wheels comprising a copolymer resin (A), and 1 to 30 parts by mass of fumed silica (B) and 0.1 to 10 parts by mass of a magnesium-containing phosphoric acid-based compound (C), per 100 parts by mass of the total solids content of the copolymer resin (A). The invention also provides (2) the primer coating composition for aluminum wheels according to Item (1), further comprising 0.1 to 10 parts by mass of metal-ion exchanged silica (D), per 100 parts by mass of the total solids content of the copolymer resin (A).

17 Claims, No Drawings

PRIMER COATING COMPOSITION FOR ALUMINUM WHEELS

CROSS REFERENCE OF RELATED APPLICATION

This application claims priority to JP2013-098611A, filed on May 8, 2013, the disclosure of which is incorporated herein by reference in its entirety.

TECHNICAL FIELD

The present invention relates to a primer coating composition for aluminum wheels. This primer coating composition for aluminum wheels of the present invention has excellent stability and is capable of forming a coating film having excellent corrosion resistance, edge corrosion resistance, and filiform corrosion resistance.

BACKGROUND ART

Aluminum and aluminum alloy components are easily mechanically processed (e.g., cut or polished), have excellent corrosion resistance, and improve fuel efficiency due to their light weight. In view or these aspects, they are widely used in automotive components, such as aluminum wheels. The aluminum wheel is coated with a primer coating composition; this coating film is required to have properties, such as corrosion resistance, edge corrosion resistance, and filiform corrosion resistance.

Recent aluminum wheels are increasingly being given complex designs to provide a luxurious appearance, resulting in a greater number of sharply cut edge portions. To protect the edge portions by coating, coating compositions with various innovations have been developed.

Patent Literature (PTL) 1, for example, discloses a primer coating composition comprising 100 parts by weight of self-crosslinkable acrylic resin, 10 to 20 parts by weight of ultrafine particle silica, 3 to 10 parts by weight of epoxy resin, and 5 to 20 parts by weight of a silane coupling agent.

Additionally, PTL 2 discloses an aluminum wheel coating method comprising applying a specific anticorrosive coating composition (printer coating composition) to an aluminum wheel, and subsequently applying a clear coating composition. This anticorrosive coating composition contains a specific acrylic resin and a specific epoxy resin, and optionally a silica powder.

However, aluminum, wheels are sometimes used in harsh corrosive environments where salt damage is caused while driving due to snow-melting salt spread in cold regions. Therefore, the coating films formed of the primer coating compositions disclosed in PTL 1 or 2 had insufficient performance in corrosion resistance, edge corrosion resistance, or filiform corrosion resistance.

CITATION LIST

Patent Literature

PTL 1: JPH05-51553A
PTL 2: WO 2012/096331

SUMMARY OF INVENTION

Technical Problem

An object of the present invention is to find a primer coating composition for aluminum wheels, the coating composition having excellent stability and being capable of forming a coating film having excellent corrosion resistance, edge corrosion resistance, and filiform corrosion resistance. (Hereinafter the "primer coating composition for aluminum wheels" is sometimes simply abbreviated as a "primer coating composition.")

Solution to Problem

As a result of extensive research, the present inventors found that the above object can be achieved by a primer coating composition for aluminum wheels comprising a specific copolymer resin (A), and 1 to 30 parts by mass of fumed silica (B) and 1 to 10 parts by mass of a magnesium-containing phosphoric acid-based compound (C), per 100 parts by mass of the total solids content of the copolymer resin (A). The present invention has thereby been accomplished.

Specifically, the present invention relates to the following:

1. A primer coating composition for aluminum wheels, the composition comprising:

a copolymer resin (A) obtained by reacting a mixture containing a nitrogen-containing radical polymerizable unsaturated monomer (a1) represented by Formula (1) below in an amount of 5 to 35 mass %, a carboxyl-containing radical polymerizable unsaturated monomer (a2) in an amount of 1 to 10 mass %, and a radical polymerizable unsaturated monomer (a3) other than (a1) and (a2) in an amount of 55 to 94 mass %, relative to the sum of the constituting monomers, and 1 to 30 parts by mass of fumed silica (B) and 0.1 to 10 parts by mass of a magnesium-containing phosphoric acid-based compound (C), per 100 parts by mass of the total solids content of the copolymer resin (A),

[Chem. 1]

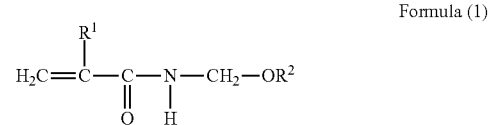

Formula (1)

wherein $R^1$ represents a hydrogen atom or $CH_3$, and $R^2$ represents a hydrogen atom or a $C_{1-6}$ alkyl group.

2. The primer coating composition for aluminum wheels according to Item 1, further comprising 0.1 to 10 parts by mass of metal-ion exchanged silica (D), per 100 parts by mass of the total solids content of the copolymer resin (A).

3. The primer coating composition for aluminum wheels according to Item 1 or 2, further comprising 1 to 20 parts by mass of an epoxy compound (E), per 100 parts by mass of the total solids content of the copolymer resin (A).

4. The primer coating composition for aluminum wheels according to any one of Items 1 to 3, further comprising 1 to 20 parts by mass of a silane coupling agent (F), per 100 parts by mass of the total solids content of the copolymer resin (A).

5. The primer coating composition for aluminum wheels according to any one of Items 1 to 4, further comprising 1 to 30 parts by mass of a dehydrating agent (G), per 100 parts by mass of the total solids content of the copolymer resin (A).

6. A method for forming a coating film, the method comprising:

forming an uncured or cured coating film of the primer coating composition for aluminum wheels of any one of Items 1 to 5 on an aluminum wheel whose surface is optionally treated; and forming at least one overcoating film on the uncured or cored coating film.

Advantageous Effects of Invention

The primer coating composition of the present invention has excellent stability. An aluminum wheel coated with this primer coating composition shows excellent performance in corrosion resistance, edge corrosion resistance, and filiform corrosion resistance.

DESCRIPTION OF EMBODIMENTS

The present invention relates to a primer coating composition for aluminum wheels, the composition comprising a specific copolymer resin (A), fumed silica (B), and a magnesium-containing phosphoric acid-based compound (C). This primer coating composition may further optionally comprise metal-ion exchanged silica (D), an epoxy resin (E), a silane coupling agent (F), a dehydrating agent (G), and the like. A detailed description is given below.

Copolymer Resin (A)

A copolymer resin (A) used in the primer coating composition of the present invention is obtained by reacting a mixture containing a nitrogen-containing radical polymerizable unsaturated monomer (a1) represented by Formula (1) below in an amount of 5 to 35 mass %, a carboxyl-containing radical polymerizable unsaturated monomer (a2) in an amount of 1 to 10 mass %, and a radical polymerizable unsaturated monomer (a3) other than (a1) and (a2) in an amount of 55 to 94 mass %.

[Chem. 2]

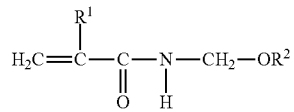

Formula (1)

In Formula (1), $R^1$ represents a hydrogen atom or $CH_3$, and $R^2$ represents a hydrogen atom or a $C_{1-6}$ alkyl group.

A radical polymerizable unsaturated monomer as used herein refers to a monomer having one or more (e.g., one to four) polymerizable unsaturated groups. The polymerizable unsaturated group refers to an unsaturated group that can undergo radical polymerization. Examples of the polymerizable unsaturated group include vinyl, (meth)acryloyl, (meth)acrylamide, vinyl ether, allyl, and the like.

Nitrogen-Containing Radical Polymerizable Unsaturated Monomer (a1)

Examples of the $C_{1-6}$ alkyl group represented by $R^2$ of Formula (1), which represents a nitrogen-containing radical polymerizable unsaturated monomer (a1) include linear or branched alkyl groups having 1 to 6, preferably 1 to 4, carbon atoms. Specific examples include methyl, ethyl, n-propyl, i-propyl, n-butyl, i-butyl, t-butyl, n-pentyl, n-hexyl, and the like.

As the nitrogen-containing radical polymerizable unsaturated monomer (a1), a monomer represented by Formula (1) described above may be used with no particular limitation. Examples include N-methylol (meth)acrylamide, N-methoxymethyl(meth)acrylamide, N-propoxymethyl (meth)acrylamide, N-i-propoxymethyl(meth)acrylamide, N-butoxymethyl(meth)acrylamide, N-i-butoxymethyl (meth)acrylamide, N-pentyloxymethyl(meth)acrylamide, N-hexyloxymethyl(meth)acrylamide, and the like. These nitrogen-containing radical polymerizable unsaturated monomers (a1) may be arbitrarily used singly or in a combination of two or more.

Carboxyl-Containing Radical Polymerizable Unsaturated Monomer (a2)

Examples of the carboxyl-containing radical polymerizable unsaturated monomer (a2) include a radical polymerizable unsaturated monomer having one or more, preferably one or two, carboxyl groups. Examples of the carboxyl-containing radical polymerizable unsaturated monomer (a2) include, but are not particularly limited to, acrylic acid, methacrylic acid, maleic acid, crotonic acid, itaconic acid, fumaric acid, anhydrides or half-esterified products thereof, and the like. These carboxyl-containing radical polymerizable unsaturated monomers (a2) may be arbitrarily used singly or in a combination of two or more.

Radical Polymerizable Unsaturated Monomer (a3) Other than (a1) and (a2)

Examples of the radical polymerizable unsaturated monomer (a3) other than (a1) and (a2) include, but are not particularly limited to, hydroxyl-containing radical polymerizable unsaturated monomers, such as 2-hydroxyethyl (meth)acrylate, 2-hydroxypropyl (meth)acrylate, hydroxybutyl (meth)acrylate, 2-hydroxychloropropyl (meth)acrylate, and "Placcel F" series (lactone-modified (meth)acrylic acid ester), trade name, produced by Daicel Chemical Industries, Ltd.; $C_{1-18}$ alkyl esters or cycloalkyl esters of acrylic acids or methacrylic acids, such as methyl (meth)acrylate, ethyl (meth)acrylate, propyl (meth)acrylate, butyl (meth) acrylate, pentyl (meth)acrylate, hexyl (meth)acrylate, octyl (meth)acrylate, nonyl (meth)acrylate, decyl (meth)acrylate, lauryl (meth)acrylate, tridecyl (meth)acrylate, cetyl (meth) acrylate, stearyl (meth)acrylate, benzyl (meth)acrylate, phenoxyethyl (meth)acrylate, methoxyethyl (meth)acrylate, ethylcarbitol (meth)acrylate, isopropyl (meth)acrylate, n-butyl (meth)acrylate, i-butyl (meth)acrylate, t-butyl (meth) acrylate, neopentyl (meth)acrylate, ethylhexyl (meth)acrylate, isodecyl (meth)acrylate, isostearyl (meth)acrylate, cyclohexyl (meth)acrylate, isobornyl (meth)acrylate, and tricyclodecynyl (meth)acrylate; carboxylic acid amino alkyl ester radical polymerizable unsaturated monomers, such as aminoethyl (meth)acrylate, dimethylaminoethyl (meth)acrylate, and butylaminoethyl (meth)acrylate; tetrahydrofurfuryl (meth)acrylate and morpholinoethyl (meth)acrylate; epoxy group-containing radical polymerizable unsaturated monomers, such as glycidyl (meth)acrylate, allyl glycidyl ether, and glycidyl vinyl ether; alkoxysilyl-group containing radical polymerizable unsaturated monomers, such as trimethoxysilylpropyl (meth)acrylate, triethoxysilylpropyl (meth)acrylate, methyldimethoxysilylpropyl (meth)acrylate, and vinyltrimethoxysilane; α-olefins, such as ethylene, propylene, and isobutylene; partially halogenated olefins, such as vinyl chloride, vinylidene chloride, vinyl fluoride, and vinylidene fluoride; allyl compounds, such as allyl acetate and allyl butyrate; crotonic acid esters, such as ethyl crotonate and propyl crotonate; vinyl ethers, such as ethylvinyl ether and cyclohexylvinyl ether; vinyl carboxylates, such as vinyl acetate, vinyl propionate, and vinyl versatate; aromatic-based radical polymerizable unsaturated monomers, such as styrene, α-methylstyrene, and vinyltoluene; acrylonitrile, acrylamide, methacrylamide, and the like. These radical polymerizable unsaturated monomers (a3) may be arbitrarily used singly or in a combination of two or more.

In the present invention, the radical polymerizable unsaturated monomer (a3) other than (a1) and (a2) preferably comprises at least one member selected from hydroxyl-containing radical polymerizable unsaturated monomers, $C_{1-18}$ alkyl esters or cycloalkyl esters of acrylic acids or methacrylic acids, and aromatic-based radical polymerizable unsaturated monomers.

These monomers are incorporated in the following proportions: the nitrogen-containing radical polymerizable unsaturated monomer (a1) in an amount of 5 to 35 mass %, preferably 8 to 32 mass %, the carboxy-containing radical polymerizable unsaturated monomer (a2) in an amount of 1 to 10 mass %, preferably 2 to 8 mass %, and the radical polymerizable unsaturated monomer (a3) other than (a1) and (a2) in an amount of 55 to 94 mass %, preferably 60 to 90 mass %, relative to the total mass of the radical polymerizable unsaturated monomers constituting the copolymer resin (A). It is preferable to use these monomers within the above amount ranges, from the viewpoint of curability, edge corrosion resistance, and filiform corrosion resistance.

The copolymer resin (A) can be obtained by subjecting a mixture containing the nitrogen-containing radical polymerizable unsaturated monomer (a1), the carboxyl-containing radical polymerizable unsaturated monomer (a2), and the radical polymerizable unsaturated monomer (a3) other than (a1) and (a2) to a radical polymerization reaction in the presence of, for example, an inert gas, such as nitrogen, in an organic solvent maintained at about 50 to 300° C., preferably about 60 to 250° C., for about 1 to 24 hours, preferably about 2 to 10 hours.

Examples of organic solvents used in the radical polymerization reaction include alcohols, such as n-propanol, isopropanol, n-butanol, t-butyl alcohol, and isobutyl alcohol; and ethers, such as ethylene glycol monobutyl ether, methyl carbitol, 2-methoxyethanol, 2-ethoxyethanol, 2-isopropoxyethanol, 2-butoxyethanol, ethylene glycol monomethyl ether, ethylene glycol monoethyl ether, ethylene glycol, monobutyl ether, 1-methoxy-2-propanol, 1-ethoxy-2-propanol, and propylene glycol monomethyl ether. For example, aromatic solvents, such as xylene and toluene; ketones, such as acetone, methylethylketone, 2-pentanone, 2-hexanone, methyl isobutyl ketone, isophorone, and cyclohexanone; and esters, such as methyl acetate, ethyl acetate, pentyl acetate, 3-methoxybutyl acetate, 2-ethylhexyl acetate, benzyl acetate, cyclohexyl acetate, methyl propionate, and ethyl propionate, may also be used in combination.

Examples of polymerization initiators used in the radical polymerization reaction include benzoyl peroxide, di-t-butyl hydroperoxide, t-butyl hydroperoxide, cumyl peroxide, cumene hydroperoxide, t-butylperoxy benzoate, lauryl peroxide, acetyl peroxide, azobisdimethylvaleronitrile, azobisisobutyronitrile, and the like.

The copolymer resin (A) has a weight average molecular weight of 10,000 to 80,000, particularly preferably 16,000 to 70,000, an acid value of 10 to 40 mgKOH/g, particularly preferably 12 to 35 mgKOH/g, and a hydroxyl value of 0 to 120 mgKOH/g, particularly 55 to 105 mgKOH/g. These ranges are preferable to improve the coating film performance and coating composition stability.

The copolymer resin (A) has a glass transition temperature (Note 1) of 0 to 70° C., and particularly preferably 10 to 40° C. The copolymer resin (A) in the primer coating composition of the present invention may be a single copolymer resin or a combination of two or more copolymer resins.

(Note 1) Glass transition temperature of the copolymer resin (A): The glass transition temperature (° C.) refers to a static glass transition temperature. For example, a sample is taken in a measuring cup and subjected to vacuum suction to completely remove the solvent, followed by measurement of changes in the quantity of heat at a heating rate of 3° C./min in a temperature range of −100 to 100° C. using a differential scanning calorimeter "DSC-50Q" (produced by Shimadzu Corp., trade name). The initial change point in the baseline at the low temperature side is considered to be the glass transition temperature.

The number average molecular weight as used herein refers to a value calculated from a chromatogram measured by gel permeation chromatography in accordance with the method of JIS K 0124-83, based on the molecular weight of standard polystyrene. For the gel permeation chromatography, the HLC8120GPC (produced by Tosoh Corporation) was used. The measurement was conducted using four columns, "TSK gel G-4000HXL," "TSK gel G-3000HXL," "TSK gel G-2500HXL," and "TSK gel G-2000HXL" (all produced by Tosoh Corporation, trade names), under the following conditions: mobile phase: tetrahydrofuran, measuring temperature: 40° C., flow rate: 1 mL/min, and detector: RI.

Fumed Silica (B)

Fumed silica (B) used in the primer coating composition of the present invention is dry silica synthesized by evaporating silicon chloride and performing a gas phase reaction in a hydrogen flame at a high temperature. The fumed silica (B) is amorphous, vitreous, spherical, and has no fine pores. The average primary particle diameter of the fumed silica (B) is 5 to 100 nm, and preferably 20 to 50 nm. The average primary particle diameter of the fumed silica (B) can be measured by using an electron microscope. The specific surface area of the fumed silica (B) is 100 to 1,000 $m^2/g$, and preferably 200 to 500 $m^2/g$.

Examples of commercially available products of the fumed silica (B) include Aerosil 130, Aerosil 200, Aerosil R202, Aerosil 300, Aerosil 300CF, Aerosil 380PE, Aerosil R805, Aerosil R811, Aerosil R812, Aerosil R971, and Aerosil R974 (all produced by Nippon Aerosil Co., Ltd.).

The primer coating composition of the present invention comprises the fumed silica (B) in an amount of 1 to 30 parts by mass, preferably 10 to 28 parts by mass, and more preferably 15 to 25 parts by mass, per 100 parts by mass of the total solids content of the copolymer resin (A). This amount range is desirable to achieve excellent coating composition stability and to obtain a coating film having excellent edge corrosion resistance and filiform corrosion resistance.

Magnesium-Containing Phosphoric Acid-Based Compound (C)

A magnesium-containing phosphoric acid-based compound (C) is a metal salt of a phosphoric acid compound, such as phosphoric acid, phosphorous acid, and tripolyphosphoric acid, and is a compound containing at least magnesium as a metal element. The magnesium ions and phosphoric acid ions released from the magnesium-containing phosphoric acid-based compound (C) serve to effectively improve the edge corrosion resistance and filiform corrosion resistance.

Specific examples of the magnesium-containing phosphoric acid-based compound (C) include magnesium phosphate; a codeposit of magnesium/ammonium phosphate; magnesium monohydrogen phosphate; magnesium dihydrogen phosphate; a codeposit of magnesium/calcium phosphate; a codeposit of magnesium/cobalt phosphate; a codeposit of magnesium/nickel phosphate; magnesium phosphite; a codeposit of magnesium/calcium phosphite; magnesium tripolyphosphate; and a metal phosphate treated with a magnesium containing compound, such as aluminum dihydrogen tripolyphosphate treated with magnesium oxide and zinc dihydrogen tripolyphosphate treated with magnesium oxide. Examples also include silica-modified compounds of magnesium phosphate, such as silica-modified magnesium phosphate, and the like.

Examples of commercially available products of the magnesium-containing phosphoric acid-based compound (C) include K-White G105 (produced by Tayca Corporation, trade name), LF Bousei CRF-15 (produced by Kikuchi Color & Chemicals Corporation, trade name), and the like.

The primer coating composition of the present invention comprises the magnesium-containing phosphoric acid-based compound (C) in an amount of 0.1 to 10 parts by mass, preferably 0.2 to 5 parts by mass, and more preferably 0.3 to 3 parts by mass, per 100 parts by mass of the total solids content of the copolymer resin (A). This amount range is desirable to achieve excellent coating composition stability and to obtain a coating film having excellent edge corrosion resistance and filiform corrosion resistance.

Metal-Ion Exchanged Silica (D)

In metal-ion exchanged silica (D), the metal is at least one member selected from calcium and magnesium. Examples include calcium-ion exchanged silica and magnesium-ion exchanged silica. The metal-ion exchanged silica (D) may be modified with phosphoric acid to obtain phosphoric acid-modified metal-ion exchanged silica, if necessary.

The above calcium-ion exchanged silica consists of silica particles obtained by introducing calcium ions into a microporous silica carrier by ion exchange. Examples of commercially available products of calcium-ion exchanged silica include Shieldex (registered trademark) C303, Shieldex AC-3, Shieldex C-5 (all produced by W.R. Grace & Co.), Sylomask 52 (produced by Fuji Silysia Chemical Ltd.), and the like.

The above magnesium-ion exchanged silica is silica particles obtained by introducing magnesium ions into a microporous silica carrier by ion exchange. Examples of commercially available products of magnesium-ion exchanged silica include Sylomask 52M (produced by Fuji Silysia Chemical Ltd.) and Novinox ACE-110 (produced by SNCZ, France).

The metal-ion exchanged silica (D) contained in the primer coating composition of the present invention preferably has an average particle diameter of 0.5 to 15 μm, and particularly 1 to 10 μm. The average particle diameter of the metal-ion exchanged silica (D) can be measured by using an electron microscope. The calcium ions or magnesium ions released from the metal-ion exchanged silica (D) are involved in various salt-forming actions, and help to improve edge corrosion resistance and filiform corrosion resistance.

When the primer coating composition of the present invention contains the metal-ion exchanged silica (D), the amount of the metal-ion exchanged silica (D) is 0.1 to 10 parts by mass, preferably 0.2 to 5 parts by mass, and more preferably 0.3 to 3 parts by mass, per 100 parts by mass of the total solids content of the copolymer resin (A). This amount range is desirable to achieve excellent coating composition stability and to obtain a coating film having excellent edge corrosion resistance and filiform corrosion resistance.

Epoxy Compound (E)

A suitable epoxy compound (E) used in the present invention has a weight average molecular weight of 300 to 4,000, and preferably 500 to 2,500. In particular, an epoxy resin (e1) obtained by reacting a polyphenol compound with epihalohydrin is preferable.

Examples of the polyphenol compound used in the formation of the epoxy resin (e1) include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolak, cresol novolak, and the like.

Among the epoxy resins (e1) that are obtained by reacting the polyphenol compound with epichlorohydrin, a resin that is derived from bisphenol A and represented by the following Formula (2) is preferable.

[Chem. 3]

Formula (2)

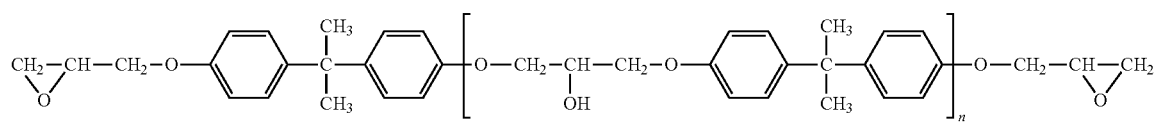

In formula (2), n is 0 to 8.

Examples of commercially available products of the epoxy resin (e1) include jER828EL, jER1001, jER1002, jER1003, jER1004, and jER1007, which are produced under these trade names by Mitsubishi Chemical Corporation.

As the epoxy compound (E), a phosphoric acid-modified epoxy resin (e2) obtained by adding a phosphoric acid compound to the epoxy resin (e1) may also be used. Compared with the epoxy compound (e1), the phosphoric acid-modified epoxy resin (e2) can improve the coating film performance, such as filiform corrosion resistance.

Examples of the phosphoric acid compound include phosphoric acid, pyrophosphoric acid, metaphosphoric acid, phosphorous acid, and the like.

Specifically, the phosphoric acid-modified epoxy resin (e2) can be obtained by adding the phosphoric acid compound to the epoxy resin (e1), and subjecting the mixture to a reaction in the presence of, for example, a catalyst, such as imidazoles or phosphonium salts, at a reaction temperature of 70 to 150° C., preferably 110 to 130° C., for a reaction time of 1 to 8 hours, preferably 3 to 6 hours. The thus-obtained phosphoric acid-modified epoxy resin (e2) has a weight average molecular weight of 300 to 2,000, and preferably 500 to 1,800, from the viewpoint of corrosion resistance.

Examples of commercially available products of the phosphoric acid-modified epoxy resin (e2) include XU-8096.07, XU-71899.00, XQ-82908.00, XQ-82919.00, DER620-PP50, DER621-EB50, DER621-PP50 (produced by Dow Chemical Company, trade names), Epo Tohto ZX1300 and ZX1300-1 (produced by Tohto Kasei Co., Ltd., trade names), and the like.

When the primer coating composition of the present invention contains the epoxy compound (E), the amount of the epoxy compound (E) is 1 to 20 parts by mass, preferably 2 to 15 parts by mass, and more preferably 4 to 12 parts by mass, per 100 parts by mass of the total solids content of the copolymer resin (A).

This amount range is desirable to achieve excellent coating composition stability and to obtain a coating film having excellent, edge corrosion resistance and filiform corrosion resistance.

Silane Coupling Agent (F)

Examples of a silane coupling agent (F) include amino group-containing silane coupling agents, such as γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, γ-ureidopropyltriethoxysilane, N-(β-(N-vinylbenzylaminoethyl)-γ-aminopropyltrimethoxysilane), and γ-anilinopropyltrimethoxysilane; epoxy group-containing silane coupling agents, such as γ-glycidoxypropylmethyldimethoxysilane, γ-glycidoxypropyltriethoxysilane, and β-(3,4-epoxycyclohexyl)ethyltrimethoxysilane; carboxyl-containing silane coupling agents, such as β-carboxylethylphenylbis(2-methoxyethoxy)silane, and N-β-(N-carboxymethylaminoethyl)-γ-aminopropyltrimethoxysilane; and the like. These silane coupling agents may be used singly or in a combination of two or more.

Examples of commercially available products of the silane coupling agent (F) include KBM-402, KBM-403, KBM-502, KBM-503, KBM-603, KBE-903, KBM-603, KBE-602, and KBE-603 (produced by Shin-Etsu Chemical Co., Ltd., trade names).

When the silane coupling agent (F) is incorporated in the present invention, the amount of the silane coupling agent (F) is 1 to 20 parts by mass, preferably 2 to 15 parts by mass, and more preferably 5 to 12 parts by mass, per 100 parts by mass of the total solids content of the copolymer resin (A). This amount range is desirable to achieve excellent coating composition stability and to obtain a coating film having more excellent edge corrosion resistance and filiform corrosion resistance.

Dehydrating Agent (G)

The primer coating composition of the present invention has excellent stability. When, however, the primer coating composition of the present invention further comprises a dehydrating agent (G), the edge corrosion resistance, filiform corrosion resistance, and coating composition stability can be improved. Examples of the dehydrating agent (G) include orthomethyl acetate and orthomethyl formate.

When the dehydrating agent (G) is incorporated in the present invention, the amount of the dehydrating agent (G) is 1 to 30 parts by mass, preferably 10 to 25 parts by mass, and more preferably 15 to 23 parts by mass, per 100 parts by mass of the total solids content of the copolymer resin (A), to improve the coating composition stability.

Primer Coating Composition

The primer coating composition of the present invention is obtained by mixing the copolymer resin (A), the fumed silica (B), and the magnesium-containing phosphoric acid-based compound (C), and optionally the metal-ion exchanged silica (D), the epoxy compound (E), the silane coupling agent (F), the dehydrating agent (G), and the like, and allowing the resulting mixture to be dissolved or dispersed in an organic solvent.

Examples of the organic solvents include ketones, such as, acetone, methylethylketone, methylbutylketone, methylisobutylketone, cyclohexanone, and methylamylketone; alcohols, such as methanol, ethanol, 2-propanol, n-propanol, iso-propanol, 2-methyl-1-propanol, n-butyl alcohol, 2-methoxy ethanol, n-octyl alcohol, and 2-ethyl-1-hexanol; ethers, such as tetrahydrofuran, 1,4-dioxane, 1,2-dimethoxyethane, diethylene glycol monoethylether, and dipropylene glycol monobutyl ether; esters, such as methyl acetate, ethyl acetate, butyl acetate, carbitol acetate, and 3-methoxybutyl acetate; amides, such as dimethylformamide and dimethylacetamide; and hydrocarbons, such as toluene, xylene, cyclohexane, and n-hexane. Examples of other organic solvents include methyl phthalate, diethyl phthalate, dibutyl phthalate, ethylene glycol monobutyl ether, diethylene glycol monobutyl ether, a mixed solvent of dimethyl adipate/dimethyl glutarate/dimethyl succinate (DBE, produced by Du Pont, trade name), N-methyl-2-pyrrolidone, isophorone, Swasol 1000 (produced by Maruzen Petrochemical Co., Ltd., trade name, aromatic-based organic solvent), and the like. These may be used singly or in a combination of two or more.

The primer coating composition of the present invention may further optionally comprise a hydroxyl-containing acrylic resin (an acrylic resin not containing the nitrogen-containing radical polymerizable unsaturated monomer (a1) in the mixture of the monomers, and thus being different from the copolymer resin (A)), other resins (e.g., polyester resin, epoxy resin, polyurethane resin), dye, color pigment, extender pigment, metallic pigment, plasticizer, antisettling agent, curing catalyst, UV absorber, antioxidant, surface control agent, anti-sagging agent, thickener, antifoaming agent, lubricant, crosslinkable polymer particle (micro gel), and the like.

The hydroxyl-containing acrylic resin above desirably has a weight average molecular weight of 1,000 to 20,000, particularly 5,000 to 15,000, an acid value of 1 to 50 mgKOH/g, particularly 5 to 30 mgKOH/g, a hydroxyl value of 0 to 350 mgKOH/g, particularly 55 to 110 mgKOH/g, and a glass transition temperature (Note 1) of 10 to 50° C., particularly 25 to 40° C., to improve the coating film performance and coating composition stability.

The thus-obtained primer coating composition is applied to aluminum wheels used for automobiles, motorcycles, trucks, vans, and the like. An aluminum wheel is made of an alloy of aluminum as the main component with magnesium, silicon, or the like. The aluminum wheel is desirably surface treated in view of the edge corrosion resistance and the filiform corrosion resistance. Examples of the surface treatment include chromate treatment (e.g., chromium chromate, chromium phosphate), non-chromium treatment (e.g., zirconium phosphate, zirconium oxide), and the like.

The primer coating composition is preferably applied by a method such as airless spray coating, air spray coating, or electrostatic coating. The viscosity at the time of application is preferably 5 to 15 seconds as measured by Ford cup No. 4 at 20° C. The coating film preferably has a thickness of 5 to 25 μm, and more preferably 10 to 23 μm, based on the cured coating film. The obtained coating film can be left to stand at ordinary temperature, dried by heating at 100° C. or less, or cured by heating at 100 to 180° C., preferably 110 150° C., if necessary.

The coating film obtained by applying and curing the primer coating composition of the present invention has a glass transition temperature (coating film Tg) (Note 2) of preferably 50 to 80° C., and more preferably 55 to 75° C. When the glass transition temperature of the cured coating film is within the above range, an aluminum wheel having excellent filiform corrosion resistance and edge corrosion resistance can be obtained.

(Note 2) Glass transition temperature (coating film Tg): A sample prepared by shaping the coating film into strips was used. The measurement was performed by using a dynamic viscoelasticity measuring device.

An overcoating composition, such as a colored coating composition or clear coating composition, may be applied to the coating film of the primer coating composition, if necessary. As the colored coating composition or clear coating composition, a thermosetting acrylic-based coating composition is suitable. Specifically, a thermosetting coating composition obtained by dissolving or dispersing an acrylic resin, a crosslinking agent, and a pigment (optional component) in an organic solvent, is preferable.

Such an overcoating composition is preferably applied by a method such as airless spray coating, air spray coating, or electrostatic coating. The viscosity at the time of application is preferably 10 to 30 seconds as measured by Ford cup No. 4 at 20° C. The coating film preferably has a thickness of about 10 to 50 μm, and particularly 15 to 35 μm based on the cured coating film. Subsequently, the coating film can be left to stand at ordinary temperature or dried at 100° C. or lower, if necessary, followed by baking and drying at 100 to 180° C., preferably 110 to 150° C., for about 5 to 60 minutes, preferably about 10 to 40 minutes, to form a cured coating film.

EXAMPLES

The present invention is described in further detail below with reference to Production Examples, Examples, and Comparative Examples. However, the scope of the present invention is not limited to these Examples.

Production Example 1

Production of Copolymer Resin No. 1 Solution 30.0 parts of a mixed solvent (xylene/n-butyl alcohol=80/20) was placed into a reaction vessel and maintained at 30° C. The "mixture" shown below was added thereto dropwise over a period of 4 hours. Subsequently, 0.5 parts of azobismethylvaleronitrile was added, and the resulting mixture was maintained at 80° C. for 3 hours to allow the reaction to occur. Then, a mixed solvent (xylene/n-butyl alcohol=80/20) was further added to produce a copolymer resin No. 1 solution having a solids content of 60 mass %.

The copolymer resin No. 1 had a glass transition temperature (see Note 1) of 11.3° C., an acid value of 15.6 mgKOH/g, and a weight average molecular weight of 60,000.

Mixture
N-Butoxymethylacrylamide: 20 parts
Acrylic acid: 2 parts
Styrene: 30 parts
Ethyl acrylate: 48 parts
Azobismethylvaleronitrile: 5 parts Production Examples 2 to 7

Comparative Production Examples 1 to 6

Production of Copolymer Resin No. 2 to No. 13 Solutions

Copolymer resin No. 2 to No. 13 solutions were obtained as in Production Example 1, except that the formulations shown in Table 1 were used.

TABLE 1

|  |  |  | Production Ex. 1 | Production Ex. 2 | Production Ex. 3 | Production Ex. 4 | Production Ex. 5 | Production Ex. 6 | Production Ex. 7 |
|---|---|---|---|---|---|---|---|---|---|
| Copolymer resin |  |  | No. 1 | No. 2 | No. 3 | No. 4 | No. 5 | No. 6 | No. 7 |
| Mixture | (a1) | N-butoxymethylacrylamide | 20 | 20 | 10 | 30 | 20 | 20 | 20 |
|  | (a2) | Acrylic acid | 2 | 2 | 2 | 8 | 2 | 2 | 2 |
|  | (a3) | Styrene | 30 | 30 | 30 | 16 |  | 30 | 25 |
|  |  | Methyl methacrylate |  | 10 | 15 | 10 | 40 |  |  |
|  |  | Ethyl acrylate | 48 | 15 | 10 | 16 | 10 | 46 | 35 |
|  |  | n-Butyl acrylate |  | 23 | 33 | 20 | 28 |  | 5 |
|  |  | 2-Hydroxyethyl methacrylate |  |  |  |  |  | 2 | 13 |
|  | Polymerization initiator | Azobismethylvaleronitrile | 5 | 5 | 5 | 5 | 5 | 5 | 5 |
| Features |  | Glass transition temperature (see Note 1) | 11.3 | 12.1 | 10.8 | 10.8 | 10.8 | 12.9 | 13.9 |

TABLE 1-continued

|  |  |  |  |  |  |  |  |
|---|---|---|---|---|---|---|---|
| Acid value (mgKOH/g) | 15.6 | 15.6 | 15.6 | 62.3 | 15.6 | 15.6 | 15.6 |
| Hydroxyl value (mgKOH/g) | 0 | 0 | 0 | 0 | 0 | 9 | 56 |
| Weight average molecular weight | 60,000 | 60,000 | 55,000 | 60,000 | 60,000 | 60,000 | 60,000 |

|  |  |  | Comp. Production Ex. 1 | Comp. Production Ex. 2 | Comp. Production Ex. 3 | Comp. Production Ex. 4 | Comp. Production Ex. 5 | Comp. Production Ex. 6 |
|---|---|---|---|---|---|---|---|---|
| Copolymer resin |  |  | No. 8 | No. 9 | No. 10 | No. 11 | No. 12 | No. 13 |
| Mixture | (a1) | N-butoxymethylacrylamide | 4 | 38 | 20 | 20 | 4 | 38 |
|  | (a2) | Acrylic acid | 2 | 12 | 0.5 | 11 | 2 | 12 |
|  | (a3) | Styrene | 30 | 20 | 30 | 4 | 30 | 20 |
|  |  | Methyl methacrylate | 10 |  | 10 |  | 12 |  |
|  |  | Ethyl acrylate | 33 | 10 | 15.5 | 47 | 30 | 0 |
|  |  | n-Butyl acrylate | 21 | 20 | 24 | 18 | 20 | 17 |
|  |  | 2-Hydroxyethyl methacrylate |  |  |  |  | 2 | 13 |
| Polymerization initiator |  | Azobismethylvaleronitrile | 5 | 4.5 | 5 | 5 | 5 | 4.5 |
| Features |  | Glass transition temperature (see Note 1) | 8.5 | 7.9 | 10 | −12.6 | 12.7 | 19.6 |
|  |  | Acid value (mgKOH/g) | 15.6 | 93.4 | 3.9 | 85.6 | 15.6 | 93.4 |
|  |  | Hydroxyl value (mgKOH/g) | 0 | 0 | 0 | 0 | 8.6 | 56 |
|  |  | Weight average molecular weight | 60,000 | 70,000 | 60,000 | 60,000 | 60,000 | 70,000 |

Production Example 6

Production Example of Magnesium-Ion Exchanged Silica 10 parts by mass of Sylysia 710 (produced by Fuji Silysia Chemical Ltd., trade name, silica particles, oil absorption: about 105 mL/100 g) was mixed and stirred, with 10,000 parts by mass of 5 mass % magnesium chloride aqueous solution for 5 hours. Thereafter, the solids content was collected by filtration, thoroughly washed with water, and dried to obtain magnesium-ion exchanged silica.

Production Example 7

Production Example of Phosphoric Acid-Modified Epoxy Resin Solution 280 parts of butyl glycidyl ether was added to 115 parts of 85% phosphoric acid, and reacted at 50 to 60° C. for 3 hours to obtain a phosphate ester compound.

Subsequently, 190 parts of Adeka Resin EP-4100 (produced by Asahi Denka Kogyo K.K., trade name, bisphenol A epoxy resin, epoxy equivalent: 190), 58 parts of bisphenol A, and 1 part of dimethylbenzylamine were mixed, and the resulting mixture was reacted at 150° C. for 8 hours to obtain an epoxy compound having an epoxy equivalent of 500.

115 parts of xylene and 20 parts of the phosphate ester compound obtained above were added to 248 parts of the epoxy compound obtained above and reacted at 80° C. for 5 hours. Thereafter, the xylene was allowed to flow out of the reaction tank, followed by cooling to obtain a phosphoric acid-modified epoxy resin solution. The phosphoric acid-modified epoxy resin had a weight average molecular weight of 926.

Production Example 6

Production of Hydroxyl-Containing Acrylic Resin A Solution 30.0 parts of a mixed solvent (xylene/butyl acetate=80/20) was placed into a reaction vessel and maintained at 80° C. The "mixture" shown below was added thereto dropwise over a period of 4 hours. Subsequently, 0.5 parts of azobismethylvaleronitrile was added, and the resulting mixture was maintained at 80° C. for 3 hours to allow the reaction to occur. Then, a mixed solvent (xylene/butyl acetate=80/20) was further added to produce a hydroxyl-containing acrylic resin A solution having a solids content of 60 mass %.

The hydroxyl-containing acrylic resin A had a glass transition temperature (see Note 1) of 38.2° C., an acid value of 15.0 mgKOH/g, a hydroxyl value of 103.5 mgKOH/g, and a weight average molecular weight of 15,000.

Mixture

Acrylic acid: 2 parts
Styrene: 30 parts
Methyl methacrylate: 20 parts
N-Butyl acrylate: 20 parts
2-Hydroxyethyl methacrylate: 24 parts
Azobismethylvaleronitrile: 7 parts Production Example 9

Production of Hydroxyl-Containing Acrylic Resin B Solution 30.0 parts of a mixed solvent (xylene/butyl acetate=80/20) was placed into a reaction vessel and maintained at 80° C. The "mixture" shown below was added thereto dropwise over a period of 4 hours. Subsequently, 0.5 parts of azobismethylvaleronitrile was added, and the resulting mixture was maintained at 80° C. for 3 hours to allow the reaction to occur. Then, a mixed solvent (xylene/butyl acetate=80/20) was further added to produce a hydroxyl-containing acrylic resin B solution having a solids content of 60 mass %.

The hydroxyl-containing acrylic resin B had a glass transition temperature (see Note 1) of 28.7° C., an acid value of 15.6 mgKOH/g, a hydroxyl value of 301.3 mgKOH/g, and a weight average molecular weight of 15,000.

Mixture

Acrylic acid: 2 parts
Styrene: 8 parts

N-butyl acrylate: 20 parts
2-hydroxyethyl methacrylate: 10 parts
Azobismethylvaleronitrile: 7 parts Production Example of Primer Coating Composition Example 1

Production Example of Primer Coating Composition No. 1 Solution

A mixed solvent (xylene/butyl acetate=50/50) was added to a mixture of 100 parts (solids content) of the copolymer resin No. 1 solution obtained in Production Example 1, 20 parts of Aerosil 380PE (Note 3), and 1.0 part of K-White G105 (Note 5). The resulting mixture was stirred with a stirrer (a stirring blade with a diameter of 7 cm, 700 rpm) for 1 hour to obtain a primer coating composition No. 1 having a solids content of 50 mass %.

Examples 2 to 23

Production Examples of Primer Coating Compositions No. 2 to No. 23

Primer coating compositions No. 2 to No. 23 were obtained as in Example 1, except that the formulations shown in Table 2 were used.

TABLE 2

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Primer coating composition | | | No. 1 | No. 2 | No. 3 | No. 4 | No. 5 | No. 6 | No. 7 | No. 8 |
| Formulation | Copolymer (A) | Copolymer resin No. 1 | 100 | 100 | 100 | 100 | 100 | 100 | 100 | 100 |
| | | Copolymer resin No. 2 | | | | | | | | |
| | | Copolymer resin No. 3 | | | | | | | | |
| | | Copolymer resin No. 4 | | | | | | | | |
| | | Copolymer resin No. 5 | | | | | | | | |
| | | Copolymer resin No. 6 | | | | | | | | |
| | | Copolymer resin No. 7 | | | | | | | | |
| | Fumed silica (B) | Aerosil 380PE (Note 3) | 20 | 20 | | 20 | 20 | 20 | 20 | 20 |
| | | Aerosil 130 (Note 4) | | | 20 | | | | | |
| | Magnesium-containing phosphoric acid-based compound (C) | K-White G105 (Note 5) | 25 | | | 25 | 25 | | 25 | |
| | | LF Bousei CRF-15 (Note 6) | | 25 | | | | 25 | | 25 |
| | | K-White 140E (Note 7) | | | | | | | | |
| | Metal-ion exchanged silica (D) | Magnesium-ion exchanged silica obtained in Production Ex. 6 | | | | | 25 | | | 25 |
| | | Sylomask 52M (Note 8) | | | | | | 25 | | |
| | | ShieldEx C303 (Note 9) | | | | | | | 25 | 25 |
| | Epoxy resin (E) | jER 1001 (Note 10) | | | | | | | | |
| | | Phosphoric acid-modified epoxy resin obtained in Production Ex. 7 | | | | | | | | |
| | Silane coupling agent (F) | KBM-403 (Note 11) | | | | | | | | |
| | Dehydrating agent (G) | Orthomethyl acetate | | | | | | | | |
| | Other resins | Hydroxyl-containing acrylic resin (A) | | | | | | | | |
| | | Hydroxyl-containing acrylic resin (B) | | | | | | | | |
| Properties | | Glass transition temperature (Coating film Tg)(Note 12) | 65 | 65 | 65 | 62 | 61 | 63 | 65 | 64 |
| | | Corrosion resistance (Note 13) | A | A | A | S | S | S | S | S |
| | | Edge corrosion resistance (Note 14) | A | A | A | A | A | A | A | A |
| | | Fitform corrosion resistance (Note 15) | A | A | A | A | A | A | A | A |
| | | Coating Composition Stability (Note 16) | A | A | A | A | A | A | A | A |

| | | | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Primer coating composition | | | No. 9 | No. 10 | No. 11 | No. 12 | No. 13 | No. 14 | No. 15 | No. 16 |
| Formulation | Copolymer (A) | Copolymer resin No. 1 | 100 | 100 | 100 | 100 | 100 | 100 | 50 | |
| | | Copolymer resin No. 2 | | | | | | | | 100 |
| | | Copolymer resin No. 3 | | | | | | | 50 | |
| | | Copolymer resin No. 4 | | | | | | | | |
| | | Copolymer resin No. 5 | | | | | | | | |
| | | Copolymer resin No. 6 | | | | | | | | |
| | | Copolymer resin No. 7 | | | | | | | | |
| | Fumed silica (B) | Aerosil 380PE (Note 3) | 20 | 20 | 20 | 20 | 20 | 20 | 20 | 20 |
| | | Aerosil 130 (Note 4) | | | | | | | | |
| | Magnesium-containing phosphoric acid-based compound (C) | K-White G105 (Note 5) | 25 | 25 | 25 | 25 | 25 | 25 | 25 | 25 |
| | | LF Bousei CRF-15 (Note 6) | | | | | | | | |
| | | K-White 140E (Note 7) | | | | | | | | |
| | Metal-ion exchanged silica (D) | Magnesium-ion exchanged silica obtained in Production Ex. 6 | 25 | 25 | 25 | 25 | 25 | | | |
| | | Sylomask 52M (Note 8) | | | | | | | | |
| | | ShieldEx C303 (Note 9) | | | | | | 25 | 25 | 25 |

TABLE 2-continued

| | | | | | | | | | |
|---|---|---|---|---|---|---|---|---|---|
| | Epoxy resin (E) | jER 1001 (Note 10) | 100 | 100 | | | | | |
| | | Phosphoric acid-modified epoxy resin obtained in Production Ex. 7 | | | 80 | 10.0 | 12.0 | 100 | 100 | 100 |
| | Silane coupling agent (F) | KBM-403 (Note 11) | | 100 | | | | 100 | 100 | 100 |
| | Dehydrating agent (G) | Orthomethyl acetate | | | | | | 200 | 200 | 200 |
| | Other resins | Hydroxyl-containing acrylic resin (A) | | | | | | | | |
| | | Hydroxyl-containing acrylic resin (B) | | | | | | | | |
| Properties | | Glass transition temperature (Coating film Tg)(Note 12) | 64 | 68 | 68 | 68 | 70 | 70 | 67 | 64 |
| | | Corrosion resistance (Note 13) | S | S | S | S | S | S | S | S |
| | | Edge corrosion resistance (Note 14) | S | S | S | S | S | S | S | S |
| | | Fitform corrosion resistance (Note 15) | A | S | A | A | A | S | S | S |
| | | Coating Composition Stability (Note 16) | A | A | A | A | A | A | A | A |

| | | | Ex. 17 | Ex. 18 | Ex. 19 | Ex. 20 | Ex. 21 | Ex. 22 | Ex. 23 |
|---|---|---|---|---|---|---|---|---|---|
| Primer coating composition Formulation | Copolymer (A) | Copolymer resin No. 1 | No. 17 | No. 18 | No. 19 | No. 20 | No. 21 | No. 22 | No. 23 |
| | | Copolymer resin No. 2 | | | | | | 100 | 100 |
| | | Copolymer resin No. 3 | 100 | | | | | | |
| | | Copolymer resin No. 4 | | 100 | | | | | |
| | | Copolymer resin No. 5 | | | 100 | | | | |
| | | Copolymer resin No. 6 | | | | 100 | | | |
| | | Copolymer resin No. 7 | | | | | 100 | | |
| | Fumed silica (B) | Aerosil 380PE (Note 3) | 20 | 20 | 20 | 20 | 20 | 20 | 20 |
| | | Aerosil 130 (Note 4) | | | | | | | |
| | Magnesium-containing phosphoric acid-based compound (C) | K-White G105 (Note 5) | 25 | 25 | 25 | 25 | 25 | 25 | 25 |
| | | LF Bousei CRF-15 (Note 6) | | | | | | | |
| | | K-White 140E (Note 7) | | | | | | | |
| | Metal-ion exchanged silica (D) | Magnesium-ion exchanged silica obtained in Production Ex. 6 | | | | | | | |
| | | Sylomask 52M (Note 8) | | | | | | | |
| | | ShieldEx C303 (Note 9) | 25 | 25 | 25 | 25 | 25 | 25 | 25 |
| | Epoxy resin (E) | jER 1001 (Note 10) | | | | | | | |
| | | Phosphoric acid-modified epoxy resin obtained in Production Ex. 7 | 100 | 100 | 100 | 100 | 100 | 100 | 100 |
| | Silane coupling agent (F) | KBM-403 (Note 11) | 100 | 100 | 100 | 100 | 100 | 100 | 100 |
| | Dehydrating agent (G) | Orthomethyl acetate | 200 | 200 | 200 | 200 | 200 | 200 | 200 |
| | Other resins | Hydroxyl-containing acrylic resin (A) | | | | | | 100 | |
| | | Hydroxyl-containing acrylic resin (B) | | | | | | | 100 |
| Properties | | Glass transition temperature (Coating film Tg)(Note 12) | 63 | 62 | 64 | 65 | 62 | 64 | 63 |
| | | Corrosion resistance (Note 13) | S | S | S | S | S | S | S |
| | | Edge corrosion resistance (Note 14) | S | S | S | S | S | S | S |
| | | Fitform corrosion resistance (Note 15) | S | S | S | S | S | S | S |
| | | Coating Composition Stability (Note 16) | A | A | A | A | S | S | A |

The values in the formulation are solids content.

(Note 3) Aerosil 380PE: produced by Nippon Aerosil Co., Ltd., trade name, the fumed silica (B), specific surface area: 380 m²/g (Note 4) Aerosil 130: produced by Nippon Aerosil Co., Ltd., trade name, the fumed silica (B), specific surface area: 130 m²/g (Note 5) K-White G105: produced by Tayca Corporation, trade name, the magnesium-containing phosphoric acid-based compound (C) (magnesium oxide-treated aluminum dihydrogen tripolyphosphate)

(Note 6) LF Bousei CRF-15: produced by Kikuchi Color & Chemicals Corporation, trade name, the magnesium-containing phosphoric acid-based compound (C)

(Note 7) K-White 140E: produced by Tayca Corporation, trade name, aluminum dihydrogen tripolyphosphate (Note 8) Sylomask 52M: produced by Fuji Silysia Chemical Ltd., trade name, the magnesium-ion exchanged silica (D) (average particle diameter: 2.30 to 3.30 μm)

(Note 9) Shieldex C303: produced by W.R. Grace & Co., trade name, the calcium-ion exchanged silica (D) (average particle diameter: 3 μm)

(Note 10) jER1001: produced by Mitsubishi Chemical Corporation, trade name, an epoxy resin, epoxy equivalent: 475, epoxy compound (E) (corresponds to the epoxy resin represented by Formula (2) above)

(Note 11) KBM-403; produced by Shin-Etsu Chemical Co., Ltd., trade name, silane coupling agent (F) (3-glycidoxypropyltrimethoxysilane)

Comparative Examples 1 to 14

Production of Primer Coating Compositions No. 24 to No. 37

Primer coating compositions No. 24 to No. 37 were obtained as in Example 1, except that the formulations shown in Table 3 were used.

TABLE 3

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Primer coating composition |  |  | No. 24 | No. 25 | No. 26 | No. 27 | No. 28 | No. 39 | No. 30 |
| Formulation | Copolymer (A) | Copolymer resin No. 1 | 100 | 100 | 100 | 100 | 100 | 100 |  |
|  |  | Copolymer resin No. 8 |  |  |  |  |  |  | 100 |
|  |  | Copolymer resin No. 9 |  |  |  |  |  |  |  |
|  |  | Copolymer resin No. 10 |  |  |  |  |  |  |  |
|  |  | Copolymer resin No. 11 |  |  |  |  |  |  |  |
|  |  | Copolymer resin No. 12 |  |  |  |  |  |  |  |
|  |  | Copolymer resin No. 13 |  |  |  |  |  |  |  |
|  | Fumed silica (B) | Aerosil 380OPE (Note 3) |  | 20 | 20 | 20 | 20 | 20 | 20 |
|  |  | Aerosil 130 (Note 4) |  |  |  |  |  |  |  |
|  | Magnsium-containing phosphoric acid-based compound (C) | K-White G105 (Note 5) | 25 |  |  |  |  |  | 25 |
|  |  | LF Bousei CRF-15 (Note 6) |  |  |  |  |  |  |  |
|  |  | K-White 140E (Note 7) |  |  |  |  | 25 |  |  |
|  | Metal-ion exchanged silica (D) | Magnesium-ion exchanged silica obtained in Production Ex. 6 | 25 |  | 25 | 25 | 25 |  |  |
|  |  | Sylomask 52M (Note 8) |  |  |  |  |  |  |  |
|  |  | ShieldEx C303 (Note 9) |  |  |  |  |  |  | 25 |
|  | Epoxy resin (E) | jER 1001 (Note 10) | 100 |  |  | 100 | 100 | 100 |  |
|  |  | Phosphoric acid-modified epoxy resin obtained in Production Ex. 7 |  |  |  |  |  |  |  |
|  | Silane coupling agent (F) | KBM-403 (Note 11) | 100 |  |  |  | 100 | 100 |  |
|  | Other resins | Hydroxyl-containing acrylic resin (A) |  |  |  |  |  |  |  |
|  |  | Hydrocyl-containing acrylic resin (B) |  |  |  |  |  |  |  |
| Properties |  | Glass transition temperature (Coating film Tg)(Note 12) | 69 | 66 | 63 | 69 | 66 | 64 | 52 |
|  |  | Corrosion resistance (Note 13) | B | B | B | A | A | A | B |
|  |  | Edge corrosion resistance (Note 14) | C | B | B | B | B | B | B |
|  |  | Fitform corrosion resistance (Note 15) | B | B | B | B | B | B | B |
|  |  | Coating composition stability (Note 16) | A | A | A | A | A | A | A |

|  |  |  | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|---|
| Primer coating composition |  |  | No. 31 | No. 32 | No. 33 | No. 34 | No. 35 | No. 36 | No. 37 |
| Formulation | Copolymer (A) | Copolymer resin No. 1 |  |  |  |  |  | 100 | 100 |
|  |  | Copolymer resin No. 8 |  |  |  |  |  |  |  |
|  |  | Copolymer resin No. 9 | 100 |  |  |  |  |  |  |
|  |  | Copolymer resin No. 10 |  | 100 |  |  |  |  |  |
|  |  | Copolymer resin No. 11 |  |  | 100 |  |  |  |  |
|  |  | Copolymer resin No. 12 |  |  |  | 100 |  |  |  |
|  |  | Copolymer resin No. 13 |  |  |  |  | 100 |  |  |
|  | Fumed silica (B) | Aerosil 380OPE (Note 3) | 20 | 20 | 20 | 20 | 20 |  |  |
|  |  | Aerosil 130 (Note 4) |  |  |  |  |  |  |  |
|  | Magnsium-containing phosphoric acid-based compound (C) | K-White G105 (Note 5) | 25 | 25 | 25 | 25 | 25 | 25 | 25 |
|  |  | LF Bousei CRF-15 (Note 6) |  |  |  |  |  |  |  |
|  |  | K-White 140E (Note 7) |  |  |  |  |  |  |  |
|  | Metal-ion exchanged silica (D) | Magnesium-ion exchanged silica obtained in Production Ex. 6 |  |  |  |  |  | 25 | 25 |
|  |  | Sylomask 52M (Note 8) |  |  |  |  |  |  |  |
|  |  | ShieldEx C303 (Note 9) | 25 | 25 | 25 | 25 | 25 |  |  |
|  | Epoxy resin (E) | jER 1001 (Note 10) |  |  |  |  |  | 100 | 100 |
|  |  | Phosphoric acid-modified epoxy resin obtained in Production Ex. 7 |  |  |  |  |  |  |  |
|  | Silane coupling agent (F) | KBM-403 (Note 11) |  |  |  |  |  | 100 | 100 |
|  | Other resins | Hydroxyl-containing acrylic resin (A) |  |  |  |  |  | 100 |  |
|  |  | Hydrocyl-containing acrylic resin (B) |  |  |  |  |  |  | 100 |
| Properties |  | Glass transition temperature (Coating film Tg)(Note 12) | 71 | 90 | 35 | 30 | 76 | 69 | 69 |
|  |  | Corrosion resistance (Note 13) | A | A | C | B | A | B | B |
|  |  | Edge corrosion resistance (Note 14) | B | B | B | B | B | C | C |
|  |  | Fitform corrosion resistance (Note 15) | B | B | B | B | B | B | B |
|  |  | Coating composition stability (Note 16) | A | A | B | A | A | S | A |

The values in the formulation are solids content.

(Note 12) Glass transition temperature (coating film Tg): Each primer coating composition was applied to a tin plate by spraying to a dry film thickness of 25 μm, followed by baking at a substrate surface temperature of 140° C. for 20 minutes. The coating film was peeled off from the tin plate, and formed into strips (0.5 cm×2 cm) to obtain a sample, and a measurement was performed using a dynamic viscoelasticity measuring device (FT Rheospectra DVE-V4, produced by Rheology K.K., trade name) under the conditions of a heating rate of 3° C./minute, a temperature range of 20 to 200° C., and a frequency of 110 Hz.

Preparation of Coated Aluminum Wheel Product

Each primer coating composition was applied, to a non-chromium chemical conversion-treated aluminum wheel by spraying to a dry film thickness of 25 μm, followed by setting at ordinary temperature for 5 minutes. Magicron EN-2 Clear (produced by Kansai Paint Co., Ltd., trade name, acrylic resin organic solvent-based clear coating composition) was then applied thereto to a dry film thickness of 25 μm. Subsequently, heating was performed at 140° C. for 20 minutes to obtain a coated aluminum wheel product for the test.

(Note 13) Corrosion resistance: a 10-cm cut was made using a cutter knife in the surface of the coating film of each coated aluminum wheel product to obtain samples, and a prepared CASS test solution at 50±2° C. was sprayed onto the samples for 120 hours, based on JIS Z 2371 (2000). The samples were left to stand for 24 hours, and the degree of corrosion around the cut portion was evaluated:
S: No defects such as blistering or rusting were observed in the coating film
A: Blistering or rusting of less than 1 mm from the cut portion was observed
B: Blistering or rusting of 1 mm or more and less than 2 mm from the cut portion was observed
C: Blistering or rusting of more than 2 mm from the cut portion was observed (Note 14) Edge corrosion resistance: The coated aluminum wheel products were subjected to a salt spray test in accordance with JIS Z-2371, and rusting at the edge portion of the aluminum wheel products was evaluated according to the following criteria:
S: the number of rust occurrences: 0 on the entire aluminum wheel
A: the number of rust occurrences: 1 to 3 on the entire aluminum wheel
B: the number of rust occurrences: 4 to 10 on the entire aluminum wheel
C: the number of rust occurrences: 11 or more on the entire aluminum wheel (Note 15) Filiform corrosion resistance: A cut was made in the surface of the coated aluminum wheel products, and a salt spray test was performed for 24 hours in accordance with JIS Z 2372. Thereafter, wet conditions (humidity 85%, 40° C.) were maintained for 480 hours, and the width of rust was measured from the cut portion. The width of rust or blistering from the cut portion was evaluated according to the following criteria:
S: the maximum width of rust or blistering from the cut portion was less than 2 mm (on one side)
A: the maximum width of rust or blistering from the cut portion was 2 mm or more and less than 3 mm (on one side)
B: the maximum width of rust or blistering from the cut portion was 3 mm or more and less than 4 mm (on one side)
C: the maximum width of rust or blistering from the cut portion was 4 mm or more (on one side)

(Note 16) Coating composition stability: Each primer coating composition was sealed in a container and stored at 35° C. for 35 days. The state of each coating composition after storage was evaluated according to the following criteria:
S: Excellent, showing no change from that before storage
A: A small increase in viscosity, but stirring for about 1 minute brought it back to the original state
B: An increase in the viscosity or layer separation was observed
C: Layer separation was observed

INDUSTRIAL APPLICABILITY

An aluminum wheel having excellent corrosion resistance, edge corrosion resistance, and filiform corrosion resistance can be provided.

The invention claimed is:

1. A primer coating composition for aluminum wheels, the composition comprising:
a copolymer resin (A) obtained by reacting a mixture containing a nitrogen-containing radical polymerizable unsaturated monomer (a1) represented by Formula (1) below in an amount of 5 to 35 mass %, a carboxyl-containing radical polymerizable unsaturated monomer (a2) in an amount of 1 to 10 mass %, and a radical polymerizable unsaturated monomer (a3) other than (a1) and (a2) in an amount of 55 to 94 mass %, relative to the sum of the constituting monomers, and
15 to 25 parts by mass of fumed silica (B) and 0.3 to 3 parts by mass of a magnesium-containing phosphoric acid-based compound (C), per 100 parts by mass of the total solids content of the copolymer resin (A),

[Chem. 1]

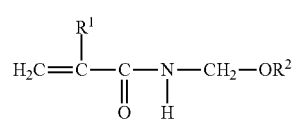

Formula (1)

wherein $R^1$ represents a hydrogen atom or $CH_3$, and $R^2$ represents a hydrogen atom or a $C_{1-6}$ alkyl group, and
the magnesium-containing phosphoric acid-based compound (C) is at least one member selected from the group consisting of magnesium phosphate, magnesium tripolyphosphate, magnesium dihydrogen phosphate, and aluminum dihydrogen tripolyphosphate treated with magnesium oxide.

2. The primer coating composition for aluminum wheels according to claim 1, further comprising 0.1 to 10 parts by mass of metal-ion exchanged silica (D), per 100 parts by mass of the total solids content of the copolymer resin (A).

3. The primer coating composition for aluminum wheels according to claim 1, further comprising 1 to 20 parts by mass of an epoxy compound (E), per 100 parts by mass of the total solids content of the copolymer resin (A).

4. The primer coating composition for aluminum wheels according to claim 1, further comprising 1 to 20 parts by mass of a silane coupling agent (F), per 100 parts by mass of the total solids content of the copolymer resin (A).

5. The primer coating composition for aluminum wheels according to claim 1, further comprising 1 to 30 parts by mass of a dehydrating agent (G), per 100 parts by mass of the total solids content of the copolymer resin (A).

6. A method for forming a coating film, the method comprising:
forming an uncured or cured coating film of the primer coating composition for aluminum wheels of claim 1 on an aluminum wheel whose surface is optionally treated; and
forming at least one overcoating film on the uncured or cured coating film.

7. The primer coating composition for aluminum wheels according to claim 2, further comprising 1 to 20 parts by mass of an epoxy compound (E), per 100 parts by mass of the total solids content of the copolymer resin (A).

8. The primer coating composition for aluminum wheels according to claim 2, further comprising 1 to 20 parts by mass of a silane coupling agent (F), per 100 parts by mass of the total solids content of the copolymer resin (A).

9. The primer coating composition for aluminum wheels according to claim 3, further comprising 1 to 20 parts by mass of a silane coupling agent (F), per 100 parts by mass of the total solids content of the copolymer resin (A).

10. The primer coating composition for aluminum wheels according to claim 2, further comprising 1 to 30 parts by mass of a dehydrating agent (G), per 100 parts by mass of the total solids content of the copolymer resin (A).

11. The primer coating composition for aluminum wheels according to claim 3, further comprising 1 to 30 parts by mass of a dehydrating agent (G), per 100 parts by mass of the total solids content of the copolymer resin (A).

12. The primer coating composition for aluminum wheels according to claim 4, further comprising 1 to 30 parts by mass of a dehydrating agent (G), per 100 parts by mass of the total solids content of the copolymer resin (A).

13. A method for forming a coating film, the method comprising:
forming an uncured or cured coating film of the primer coating composition for aluminum wheels of claim 2 on an aluminum wheel whose surface is optionally treated; and
forming at least one overcoating film on the uncured or cured coating film.

14. A method for forming a coating film, the method comprising:
forming an uncured or cured coating film of the primer coating composition for aluminum wheels of claim 3 on an aluminum wheel whose surface is optionally treated; and
forming at least one overcoating film on the uncured or cured coating film.

15. A method for forming a coating film, the method comprising:
forming an uncured or cured coating film of the primer coating composition for aluminum wheels of claim 4 on an aluminum wheel whose surface is optionally treated; and
forming at least one overcoating film on the uncured or cured coating film.

16. A method for forming a coating film, the method comprising:
forming an uncured or cured coating film of the primer coating composition for aluminum wheels of claim 5 on an aluminum wheel whose surface is optionally treated; and forming at least one overcoating film on the uncured or cured coating film.

17. The primer coating composition for aluminum wheels according to claim 1, wherein the maximum width of rust or blistering from the cut portion is less than 3 mm (on one side) when an aluminum wheel is treated with the primer coating composition, a cut is made in the surface of the coated aluminum wheel, a salt spray test is performed for 24 hours in accordance with JIS Z 2371, and wet conditions (humidity 85%, 40° C.) are maintained for 480 hours.

* * * * *